United States Patent
Kagaya et al.

(10) Patent No.: US 7,149,497 B2
(45) Date of Patent: Dec. 12, 2006

(54) RADIO SIGNAL RECEIVING DEVICE

(75) Inventors: Noriyuki Kagaya, Tokyo (JP); Yoichi Okubo, Tokyo (JP); Masaki Suto, Tokyo (JP); Takashi Uchida, Tokyo (JP); Hideaki Takahashi, Tokyo (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 485 days.

(21) Appl. No.: 10/245,006

(22) Filed: Sep. 17, 2002

(65) Prior Publication Data

US 2003/0060184 A1    Mar. 27, 2003

(30) Foreign Application Priority Data

Sep. 26, 2001    (JP)    ............... 2001-293451

(51) Int. Cl.
H04B 1/16    (2006.01)
H01P 1/04    (2006.01)

(52) U.S. Cl. .................. 455/334; 455/232.1; 455/333; 455/343.1; 333/99 S; 333/202

(58) Field of Classification Search ............... 455/334, 455/550, 341, 311, 347, 349, 550.1, 234.1, 455/232.1, 333, 343.1, 343.2, 307; 361/676, 361/678, 688, 690–695; 330/59, 53; 333/99 S, 333/202, 204; 331/107 S
See application file for complete search history.

(56) References Cited

U.S. PATENT DOCUMENTS

| | | | | |
|---|---|---|---|---|
| 1,709,763 A * | 4/1929 | Zworykin | ..................... | 330/59 |
| 1,946,582 A * | 2/1934 | Hotopp, Jr. | ................. | 455/334 |
| 1,950,653 A * | 3/1934 | Best | ............................ | 455/347 |
| 2,170,050 A * | 8/1939 | Gandtner | ..................... | 330/53 |
| 2,239,772 A * | 4/1941 | Beizer | ........................ | 455/334 |
| 2,327,321 A * | 8/1943 | Shapiro | ...................... | 381/319 |
| 2,540,822 A * | 2/1951 | Hastings | ..................... | 333/202 |
| 2,837,599 A * | 6/1958 | Marks | ...................... | 455/343.1 |
| 3,119,966 A * | 1/1964 | Slavin et al. | ............. | 455/232.1 |
| 4,735,258 A * | 4/1988 | Patarino | ..................... | 361/695 |
| 5,070,724 A * | 12/1991 | Wubs et al. | ................. | 73/45.5 |
| 5,399,906 A * | 3/1995 | Komuro | ..................... | 361/692 |
| 5,521,792 A * | 5/1996 | Pleitz et al. | ................ | 361/690 |
| 5,655,375 A * | 8/1997 | Ju | ............................. | 361/695 |
| 5,784,687 A * | 7/1998 | Itoh et al. | ...................... | 455/78 |
| 5,889,651 A * | 3/1999 | Sasaki et al. | ............... | 361/699 |
| 5,923,217 A * | 7/1999 | Durec | ......................... | 330/288 |

(Continued)

FOREIGN PATENT DOCUMENTS

JP    10163935 A *    6/1998

(Continued)

Primary Examiner—Lana Le
(74) Attorney, Agent, or Firm—John J. Penny, Jr.; Edwards Angell Palmer & Dodge LLP

(57) ABSTRACT

The radio signal receiving device that has an input terminal for inputting an input signal and an output terminal for amplifying the signal inputted to the input terminal and then outputting the signal, comprises an insulating container comprising the input terminal and the output terminal, and an amplifier that is contained in the insulating container and amplifies the signal and then outputs the signal as the output signal. Bias voltage from one of the amplifier input terminal of the amplifier and the amplifier output terminal of the amplifier is applied to the output signal outputted to the amplifier output terminal of the amplifier.

10 Claims, 7 Drawing Sheets

U.S. PATENT DOCUMENTS 6,005,441 A * 12/1999 Kawahara .................... 330/302
6,195,561 B1 * 2/2001 Rose .......................... 455/523
6,529,092 B1 * 3/2003 Fuke et al. ............... 331/107 S
6,653,904 B1 * 11/2003 Franca-Neto ............... 330/305
6,838,944 B1 * 1/2005 Franca-Neto ............... 330/305
2002/0183035 A1 * 12/2002 Glasbrener et al. ......... 455/341

FOREIGN PATENT DOCUMENTS

JP            11183303 A  *  7/1999

* cited by examiner

RADIO SIGNAL RECEIVING DEVICE

BACKGROUND OF THE INVENTION

1. Field of the Invention

The present invention relates to a radio signal receiving device. More particularly, the present invention relates to a receiving device having an input terminal for inputting an input signal and an output terminal for amplifying the input signal from the input terminal and then outputting the output signal.

2. Description of the Related Art

The conventional radio signal receiving device extracts signals from a predetermined frequency band with low noise by maintaining a band pass filter for filtering the predetermined frequency band from the input signal in a constant temperature. The band pass filter that is made from a superconductor for this object is contained within an insulating container and thereby can be maintained in the constant temperature.

FIG. 1 shows a block diagram of the structure of the conventional radio signal receiving device. The conventional radio signal receiving device includes a band pass filter 10, a low noise amplifier 20, an insulating container 80, a cooling means 40, an input terminal 60, an output terminal 50, a first power line 81, a second power line 82, a third power line 83, a fourth power line 84, a cooling member 44, a temperature sensor 46 and a temperature control heater 48.

Band pass filter 10 filters the frequency band of the input signal from input terminal 60. Insulating container 80 contains band pass filter 10 so that the filter is insulated from the outside. Low noise amplifier 20 amplifies the signal that is filtered by band pass filter 10 and then outputs the amplified signal to output terminal 50. Low noise amplifier 20 is powered from first power line 81 and second power line 82.

Cooling means 40 cools band pass filter 10 to maintain it at a temperature where the filter operates in a superconducting state, using cooling member 44. The power for operating cooling means 40 is supplied from the outside via a power terminal for cooling means 42. A temperature monitor signal showing the temperature of cooling member 44 detected by temperature sensor 46 is outputted from third power line 83. The temperature control signal for controlling temperature control heater 48 mounted in cooling member 44 is inputted from fourth power line 84.

The amplifier connected to the band pass filter is contained in the insulating container together with the band pass filter, thereby reducing heat noise. Thus, it is preferable that the temperature of cooling member 44 is constantly maintained. However, since the conventional radio signal receiving device has heat transfer from first power line 81, second power line 82, third power line 83 and fourth power line 84, it is difficult to maintain the temperature in the insulating container at a constant temperature. Thus, an insulating container, that contains the band pass filter and has higher insulating capability, has been demanded.

SUMMARY OF THE INVENTION

It is an object of the present invention to provide a radio signal receiving device, which is capable of overcoming the above drawbacks accompanying the conventional art. The above and other objects can be achieved by combinations described in the independent claims. The dependent claims define further advantageous and exemplary combinations of the present invention.

The receiving apparatus according to the first aspect of the present invention includes an input terminal inputting input signal, an output terminal outputting an amplified output signal, an insulating container having the input terminal and the output terminal, and an amplifier, contained in the insulating container, for amplifying the signal and outputting the signal as the output signal. Bias voltage from one of the amplifier input terminal of the amplifier and the amplifier output terminal of the amplifier is applied to the output signal that is outputted to the amplifier output terminal of the amplifier.

The amplifier may be a field-effect transistor and may include a self-bias circuit that allows source voltage to be higher than gate voltage.

The device may include a grounding part for grounding a gate of the amplifier. The amplifier may include a bypass circuit, which connects the amplifier output terminal with the amplifier input terminal, for extracting DC voltage from the input signal and then applying it to the output signal.

The device may comprise a band pass filter that is contained in the insulating container and filters a frequency band of the input signal, and the amplifier may amplify the signal that is filtered by the band pass filter.

The insulating container may include a first input terminal, a second input terminal, a first output terminal and a second output terminal. The device may further include a first amplifier that is contained in the insulating container and that amplifies the signal and then outputs the signal as output signal and a second amplifier that is contained in the insulating container and that amplifies the signal and then outputs the signal as output signal. Further, bias voltage from one of the first input terminal, the second input terminal, the first output terminal, and the second output terminal, may be applied to the first output signal that is outputted to the amplifier output terminal of the first amplifier, and second output signal that is outputted to the amplifier output terminal of the second amplifier.

The device may include a cooling means for cooling the band pass filter, and the temperature control signal for controlling the temperature of the cooling means may be inputted from the output terminal or the input terminal.

The device may further include a temperature sensor for measuring the temperature of the cooling means, and the temperature sensor may output a temperature monitor signal relating to the measured temperature of the cooling means to the output terminal or the input terminal.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiments are not necessarily essential to the invention.

Figure 1:
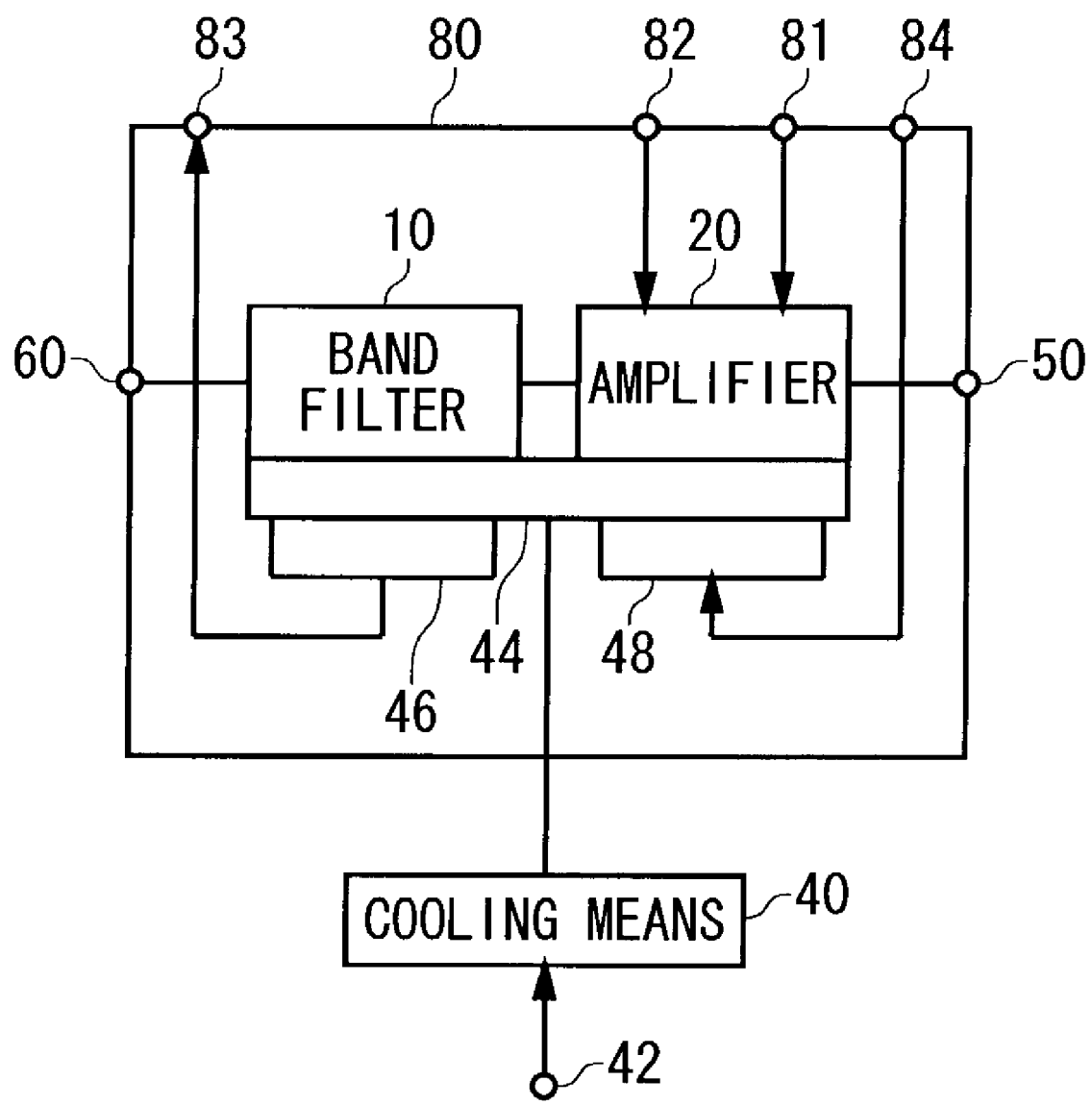
FIG. 1 shows a block diagram of the structure of the conventional radio signal receiving device.
Figure 2:
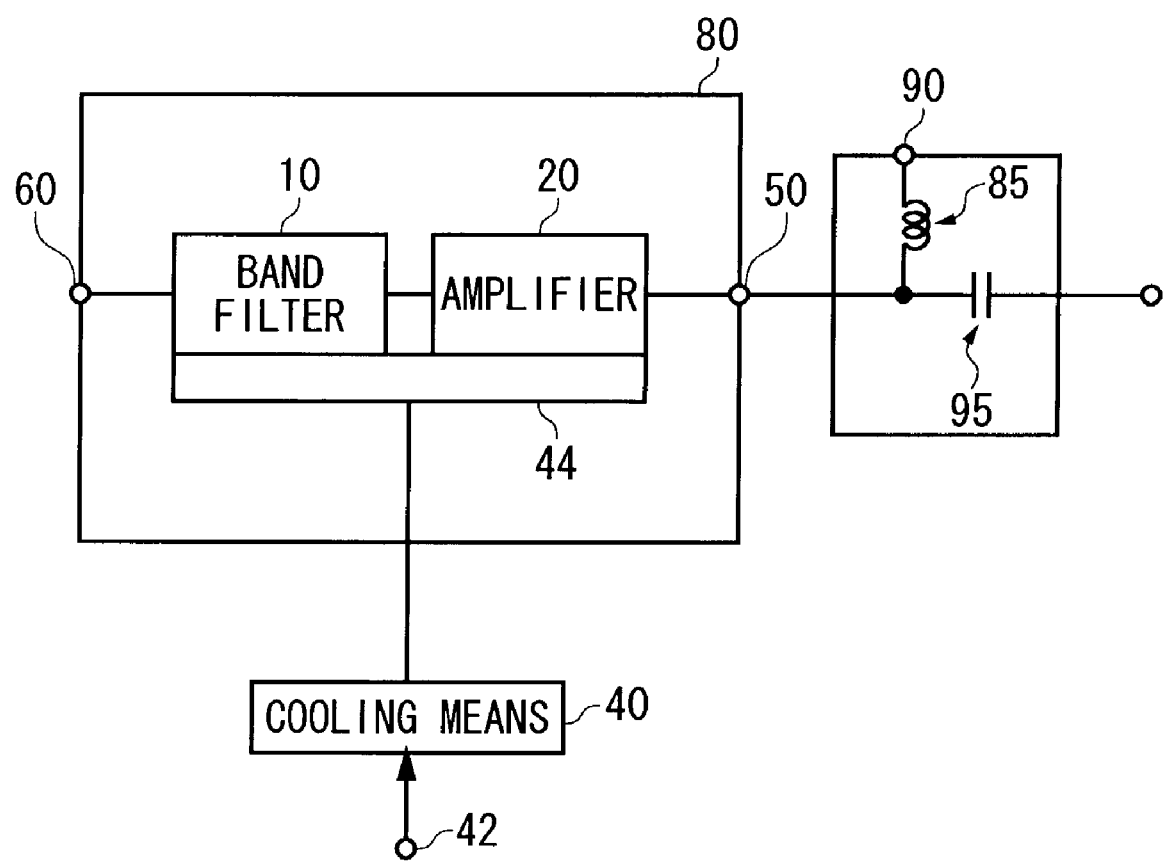
FIG. 2 shows a block diagram of the structure of a radio signal receiving device according to the first embodiment of the present invention.

FIG. 2 shows a block diagram of the structure of the radio signal receiving device according to an embodiment of the present invention. The radio signal receiving device of the present embodiment is, for example, a receiving device of a base station that is used for mobile communications and satellite communications. The radio signal receiving device comprises a band pass filter 10, a low noise amplifier 20, an insulating container 80, a cooling means 40, an input terminal 60, an output terminal 50, a first power line 90, a choke coil 85 and a capacitor 95.

Band pass filter 10 filters the frequency band of the input signal that is inputted from input terminal 60. Band pass filter 10 is, for example, a superconductor filter that has a constituent element made from superconducting material. It is preferred that the superconducting material is a high-temperature superconductor in order to maintain the superconducting material in the superconducting state. For example, the superconducting material may be a copper oxide material of, for example, Bi system, Ti system, Pb system, Y system or the like. High temperature superconducting filter (HTSF) is, for example, a thin film HTSF of micro-strip structure or a thick film HTSF of cavity resonant structure.

Insulating container 80 contains band pass filter 10 to insulate the filter from the outside. It is preferred that insulating container 80 prevents heat from entering the container by vacuum insulation. Insulating container 80 is, for example, a Dewar bottle.

Low noise amplifier 20 amplifies the signal that is filtered by band pass filter 10 and outputs the amplified signal to output terminal 50. It is preferred that low noise amplifier 20 is contained within insulating container 80 in order to lower noise. It is preferred that low noise amplifier 20 is a low noise amplifier. The first power line 90 passes choke coil 85 and the high frequency cable to supply power to low noise amplifier 20 via output terminal 50.

Cooling means 40 cools band pass filter 10 to keep it at the temperature in which band pass filter 10 shows a superconducting state, using cooling member 44. The power for operating cooling means 40 is supplied via power terminal 42 for the cooling means, from the outside. Cooling means 40 is, for example, a super cold temperature refrigerator. It is preferable that the super cold temperature refrigerator maintains a super cold temperature of several tenth Kelvin, using a heat exchange cycle that compresses and expands Helium gas or the like. Further, if low noise amplifier 20 is contained in heat-preventing container 30, cooling means 40 further cools low noise amplifier 20. Furthermore, cooling means 40 may cool band pass filter 40 and low noise amplifier 20 in different temperatures, respectively.

Figure 3:
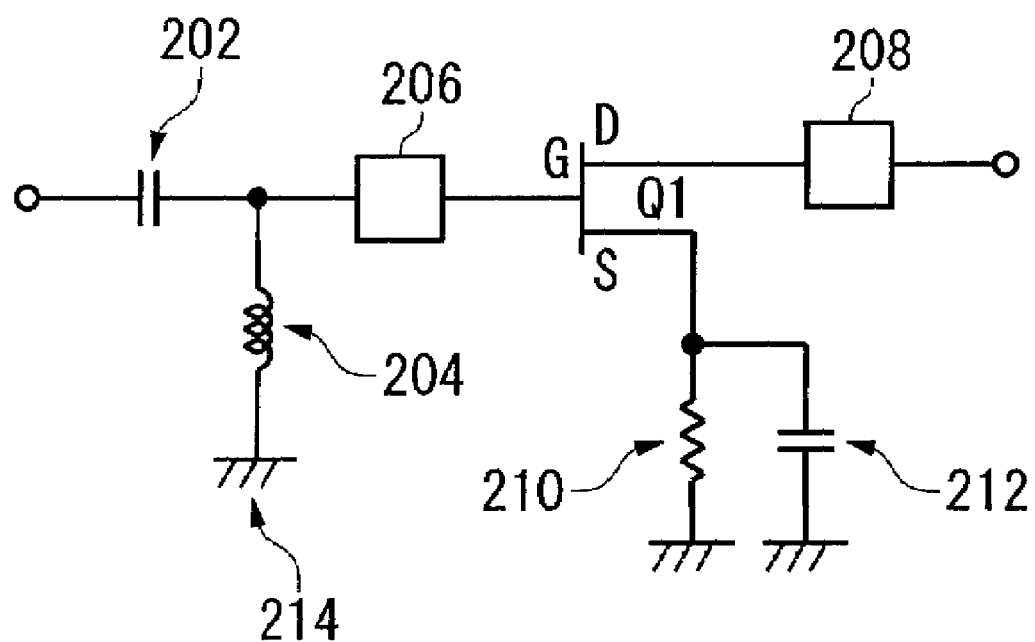
FIG. 3 shows the structure of low noise amplifier according to the first embodiment.

FIG. 3 shows the structure of low noise amplifier 20. Low noise amplifier 20 includes a transistor Q1, a capacitor 202, a choke coil 204, matching circuits 206, 208, a resistor 210, and a capacitor 212. Transistor Q1 is, for example, a field-effect transistor such as GaAs, FET and HEMT. In this way, a self-bias circuit is formed.

Matching circuit 206 matches impedance between band pass filter 10 and transistor Q1. Further, matching circuit 208 matches impedance between the drain of transistor Q1 and the outside device.

Further, the source of transistor Q1 is grounded via resistor 210. Thus, DC potential of the source increases by the potential difference between both ends of resistor 210 with respect to the DC potential of the gate.

[Second Embodiment]

The second embodiment of the present invention will be described in the following. Low noise amplifier 20 according to the first embodiment is powered via output terminal 50, however, low noise amplifier 20 of the second embodiment is powered through input terminal 60.

Figure 4:
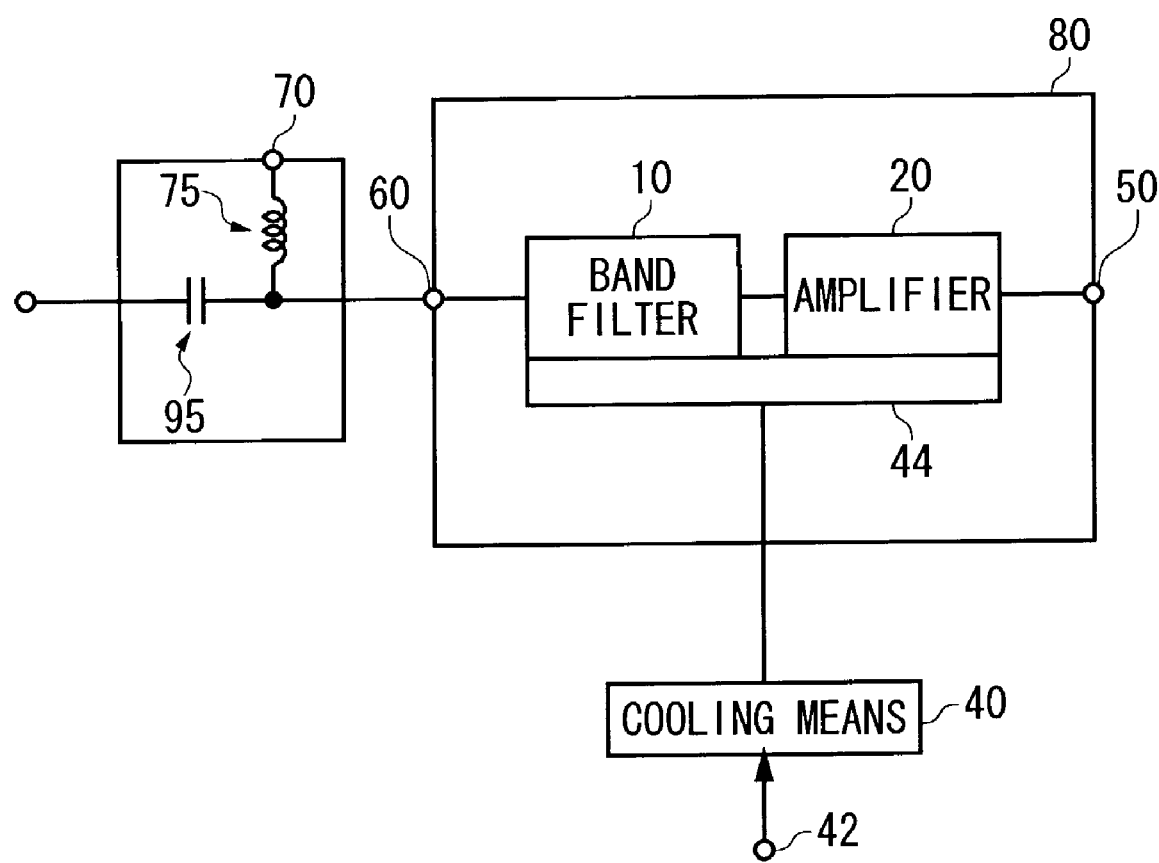
FIG. 4 shows a block diagram of the structure of a radio signal receiving device according to the second embodiment of the present invention.

FIG. 4 shows a block diagram of the structure of the radio signal receiving device according to the second embodiment. The radio signal receiving device of the second embodiment is different from that of the first embodiment in that it does not include first power line 90, choke coil 85, capacitor 95 and in that it further comprises a second power line 70, a choke coil 75, and a capacitor 65. The second power line 70 passes choke coil 75 and the high frequency cable to supply power to low noise amplifier 20 via input terminal 60.

Figure 5:
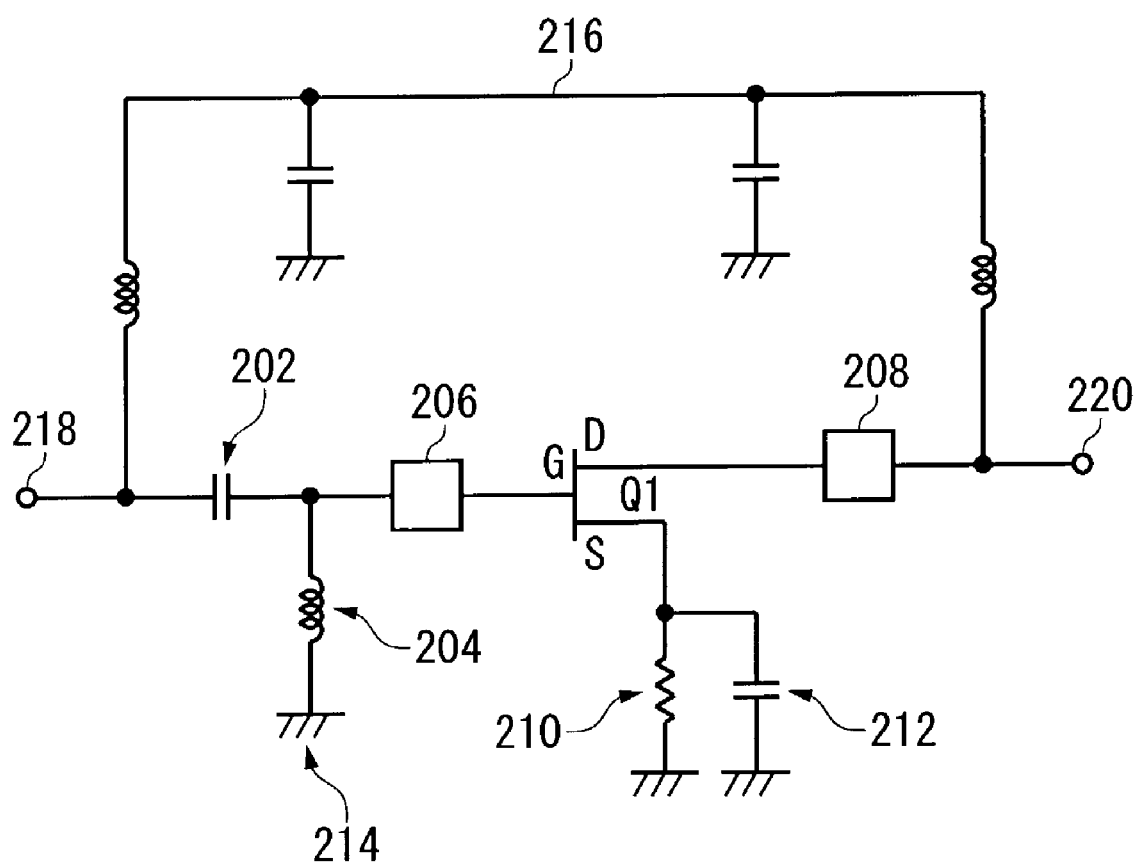
FIG. 5 shows the structure of low noise amplifier according to the second embodiment.

FIG. 5 shows the structure of low noise amplifier 20 according to the second embodiment. Low noise amplifier 20 is different from low noise amplifier 20 of the first embodiment in that it further comprises bypass circuit 216. Bypass circuit 216 connects amplifier input terminal 218 with amplifier output terminal 220. The circuit extracts DC voltage from the input signal that is inputted from the amplifier input terminal and then applies the voltage to the output signal.

Other structure and operation of the radio signal receiving device of the second embodiment is the same as those of the radio signal receiving device of the first embodiment, and thus, the description thereto is omitted.

Next, the third embodiment of the present invention will be described in the following. The radio signal receiving device of the third embodiment is provided with a plurality of band pass filters, and low noise amplifiers of the same number as the band pass filters, in a row, respectively.

Figure 6:
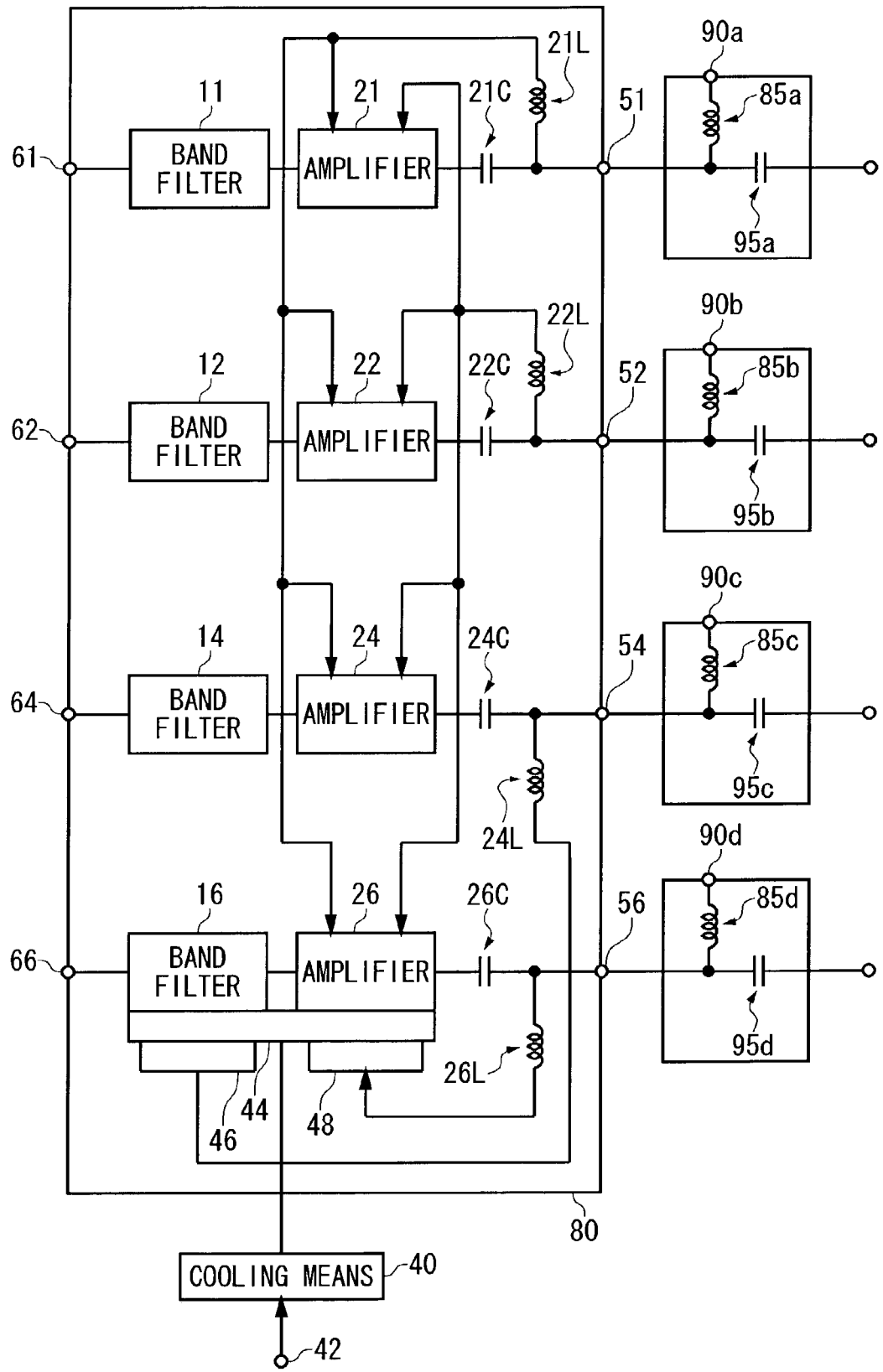
FIG. 6 shows a block diagram of the structure of the radio signal receiving device according to the third embodiment of the present invention.

FIG. 6 shows a block diagram of the structure of the radio signal receiving device according to the third embodiment. The radio signal receiving device includes a first band pass filter 11, a second band filer 12, a third band pass filter 14, a fourth band pass filter 16, a first low noise amplifier 21, a second low noise amplifier 22, a third low noise amplifier 24, a fourth low noise amplifier 26, a first input terminal 61, a second input terminal 62, a third input terminal 64, a fourth input terminal 66, a first output terminal 51, a second output terminal 52, a third output terminal 54, and a fourth output terminal 56.

First and second operating powers are supplied to each of the low noise amplifiers. First power line 90a supplies the first operating power to first low noise amplifier 21, second low noise amplifier 22, third low noise amplifier 24, fourth low noise amplifier 26, passing through choke coil 85a and the high frequency cable and further through first output terminal 51 and choke coil 21L. Second power line 90b supplies the second operating power to first low noise amplifier 21, second low noise amplifier 22, third low noise amplifier 24 and fourth low noise amplifier 26, passing through choke coil 85*b* and the high frequency cable and further through second output terminal 52 and choke coil 22L.

Temperature sensor 46 measures the temperature of cooling member 44 and outputs the temperature monitor signal indicating the measured temperature. Temperature sensor 46 outputs the temperature monitor signal to third power line 90*c*, via choke coil 24L, third output terminal 54, and choke coil 85*c*. Fourth power line 90*d* outputs the temperature control signal to temperature control heater 48, passing through choke coil 85*d*, fourth output terminal 56 and choke coil 26L.

The insulating container 80 according to the third embodiment shown in FIG. 6 also contains capacitors 21C, 22C, 24C and 26C which couple to the choke coils 21L, 22L, 24L and 26L, respectively.

Cooling member 44, temperature sensor 46, and temperature control heater 48 may be two or more. In the event that cooling member 44, temperature sensor 46, and temperature control heater 48 are two or more, temperature control signal, temperature monitor signal, power line and the like may increase in accordance with the numbers of the cooling member, the temperature sensor and the temperature control heater. Further, circuits may be added accordingly.

Figure 7:
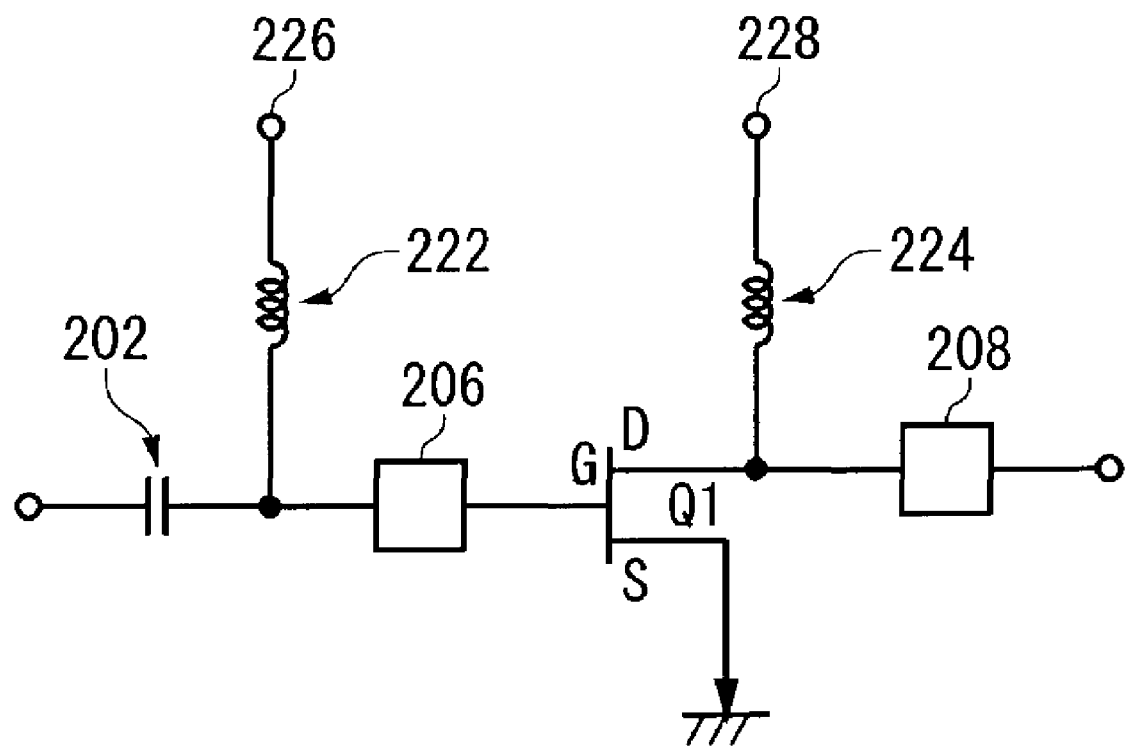
FIG. 7 shows the structure of low noise amplifier according to the third embodiment.

FIG. 7 shows the structure of low noise amplifier 20 according to the third embodiment. Power line 226 supplies the first operating power supplied from the first power line 90*a*, via choke coil 222. Power line 228 supplies the second operating power supplied from the second power line 90*b*, via choke coil 224.

The modified embodiments will be described in the following. In the event that the radio signal receiving device includes a plurality of low noise amplifier 20 and band pass filters as the third embodiment, the operating power of low noise amplifier 20 is not supplied from the amplifier output terminal as shown in FIG. 7. However, the power may be supplied from the amplifier output terminal of low noise amplifier 20 as shown in FIG. 3.

As described in the above, the present invention can provide the radio signal receiving device that has an insulating container that contains a band pass filter and an amplifier and has higher insulating capability.

Although the present invention has been described by way of exemplary embodiments, the scope of the present invention is not limited to the embodiments. Those skilled in the art might make many changes and improvements. It is clearly understood from the claims that the changes and improvements fall within the scope of the present invention.

What is claimed is:

1. A radio signal receiving device comprising:
an input terminal for inputting an input signal;
an output terminal for outputting an amplified signal;
a heat insulating container containing said input terminal and said output terminal;
a circuit separate from said heat insulting container, said circuit including a first power line, a choke coil, and a capacitor; and
an amplifier having an amplifier input terminal and an amplifier output terminal contained in said insulating container, said amplifier amplifying the input signal and outputting an amplified signal as the output signal, wherein a bias voltage from one of said amplifier input terminal and said amplifier output terminal is applied to said output signal outputted to said amplifier output terminal.

2. The radio signal receiving device according to claim 1, wherein said amplifier is a field-effect transistor and comprises a self-bias circuit that allows source voltage to be higher than gate voltage.

3. The radio signal receiving device according to claim 2, further comprising a grounding part for grounding a gate of said amplifier.

4. The radio signal receiving device according to claim 1, wherein said amplifier comprises a bypass circuit, which connects said amplifier output terminal with said amplifier input terminal, for extracting DC voltage from said input signal and applying said DC voltage to said output signal.

5. The radio signal receiving device according to claim 1 further comprising a band pass filter, that is contained in said insulating container and filters a frequency band of said input signal, wherein said amplifier amplifies said signal that is filtered by said band pass filter.

6. The radio signal receiving device according to claim 5, wherein said insulating container comprises a first input terminal, a second input terminal, a first output terminal and a second output terminal, and the device further comprising:
a first amplifier, contained in said insulating container, for amplifying said signal and outputting said signal as an output signal; and
a second amplifier, contained in said insulating container, for amplifying said signal and outputting said signal as an output signal,
wherein a bias voltage generated from at least one of said first input terminal, said second input terminal, said first output terminal and said second output terminal, is applied to said first output signal outputted to an amplifier output terminal of said first amplifier and said second output signal outputted to an amplifier output terminal of said second amplifier.

7. The radio signal receiving device according to claim 5, further comprising a cooling means for cooling said band pass filter, wherein a temperature control signal for controlling temperature of said cooling means is inputted from said output terminal or said input terminal.

8. The radio signal receiving device according to claim 7 further comprising a temperature sensor for measuring temperature of said cooling means, wherein said temperature sensor outputs a temperature monitor signal relating to measured temperature of said cooling means to said output terminal or said input terminal.

9. The radio signal receiving device according to claim 1, wherein said insulating container prevents heat from entering said insulating container by vacuum insulation.

10. The radio signal receiving device according to claim 9, wherein said insulating container is a Dewar bottle.

* * * * *